May 22, 1962    K. F. MAYERS    3,035,372
METHOD FOR MAKING A GLASS TO METAL SEAL
Original Filed March 17, 1951
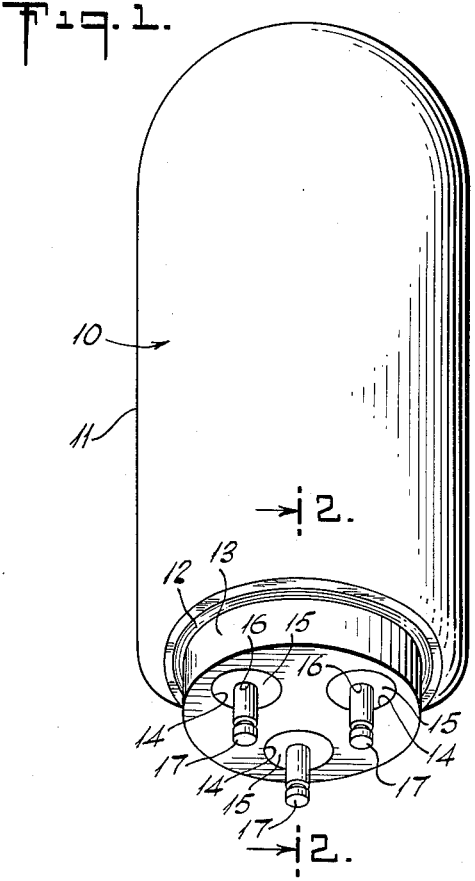
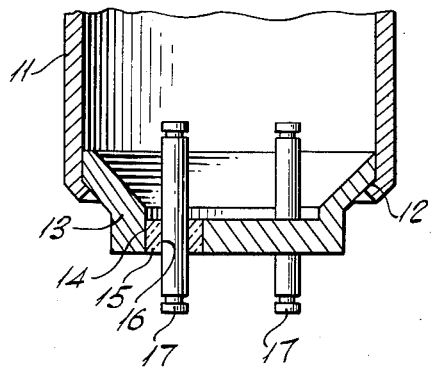
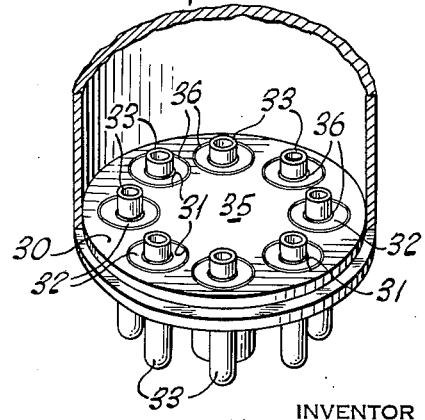
INVENTOR
KARL F. MAYERS
BY
ATTORNEY United States Patent Office 3,035,372
Patented May 22, 1962

3,035,372
METHOD FOR MAKING A GLASS TO METAL SEAL
Karl F. Mayers, Somerville, N.J., assignor to Philips Electronic and Pharmaceutical Industries Corp., a corporation of Delaware
Continuation of applications Ser. No. 216,200, Mar. 17, 1951, and Ser. No. 396,218, Dec. 4, 1953. This application Apr. 5, 1957, Ser. No. 651,065
3 Claims. (Cl. 49—81)

The present invention is directed to pressure-tight metal-to-glass seals and the methods of manufacture thereof and is a continuation of my application Serial No. 216,200, filed March 17, 1951, now abandoned, and of my application Serial No. 396,218, filed December 4, 1953, now abandoned. More particularly, the invention relates to pressure-tight or vacuum-tight metal-to-glass seals in which the glass, contrary to conventional practice, is deliberately placed under compression. Such seals have particular utility in connection with electrical devices such as electron tubes, relays, and transformers which require pressure-tight or hermetic seals. The term "pressure-tight seal" is employed in the specification and claims in a generic sense to denote a seal which is capable of withstanding pressure which may be either equal to or greater than that of the atmosphere.

A variety of metal-to-glass seals have heretofore been employed in electrical devices. In one prior type of seal, the metal and glass members forming the seal are so selected as to have mean coefficients of thermal expansion, that is, thermal coefficients of linear expansion which substantially match over a range of temperatures between the sealing temperature and the ambient or operating temperature of the completed seal. The use of metal and glass members having matching means coefficients of thermal expansion promotes a strain-free seal. However, such seals are more expensive than is desired for some applications since they employ precious metals such as platinum or expensive special ferrous-base alloys including cobalt and nickel. Due to the present greatly enlarged demands by the military services, the rare and costly metal cobalt and also nickel are not as readily available as heretofore. Furthermore, for some applications, the special iron-base alloys of the type just mentioned are not particularly satisfactory since they cannot be machined and worked as readily as is sometimes desired. Consequently, the metallic portions of such seals are usually made from relatively thin sheet material by a pressing or stamping operation and thus are subject to warping and flexing which may cause breakage of the bond and also the glass member of the seal.

Another prior metal-to-glass seal employs iron stampings and iron wire to which are fused a frit or enamel. The bond formed between the metal and the enamel during the manufacture of the seal is weak and tends to leak when the seal is subjected to minor mechanical or thermal shock or both. Consequently, a seal of this type, although employing a relatively inexpensive metal, is not satisfactory for most applications.

A further type of seal utilizes a low-expansion glass of the borosilicate type and a tubular copper member having a portion which is machined or feathered out to a thin edge that is in turn sealed to the glass. Since the copper has a much higher thermal expansion characteristic than the glass, the success of the seal depends on the edge portion being thin enough so that it may stretch and flow under changes in temperature and pressure. Seals of this type are subject to mechanical failure and are costly to manufacture.

Another seal employs metal and glass members effectively having substantially matching thermal expansion characteristics, the metal member comprising a core of nickel or iron wire having a relatively heavy copper sheath thereover. The copper sheath is effective to compensate for the differences in the expansion of the various members. Metal-to-glass seals employing such a sheath are limited to the use therein of metallic members having very small diameters.

Prior seals of the types mentioned above require more or less complex annealing steps, some of which take many hours or days to remove the stresses developed in the glass members of the seals. This annealing operation further adds to the time of manufacture and the cost of the finished product.

It is an object of the invention, therefore, to provide a new and improved pressure-tight seal which avoids one or more of the above-mentioned disadvantages and limitations of prior such seals.

It is another object of the invention to provide a pressure-tight seal which is relatively simple in construction and is strong and durable.

It is a further object of the invention to provide a new and improved metal-to-glass seal which may be subjected to mechanical and thermal shock without impairing the close adherence of the glass to the metal and the pressure-tight characteristic of the seal.

It is an additional object of the invention to provide a metal-to-glass seal which does not require precious, rare, or critical metals in the construction thereof.

It is yet another object of the present invention to provide a pressure-tight seal which does not require costly materials having substantially matching thermal expansion characteristics or lengthy annealing steps in the manufacture of the seal to alleviate stresses developed in the insulating member thereof.

It is a still further object of the invention to provide a new and improved metal-to-glass seal which utilizes inexpensive and plentiful metals in the construction thereof and yet is less subject to mechanical failures than are prior metal-to-glass seals.

It is an additional object of the invention to provide a new and improved method of making a pressure-tight seal.

In accordance with a particular form of the invention, a pressure-tight seal comprises a first metallic member having an aperture therein and having a mean coefficient of thermal expansion of a predetermined value. The seal further includes a glass insulating member supported in the aperture in the first member and having a mean coefficient of thermal expansion substantially lower than that of the first metallic member. The pressure-tight seal additionally includes a second metallic member extending through and supported in the glass insulating member and having a mean coefficient of thermal expansion substantially less than that of the first member and less than that of the glass member. The members mentioned above are relatively so dimensioned that the glass member is restrained under compression by the first metallic member in the range of operating temperatures of the seal, contiguous portions of the members being in fused relation.

Further in accordance with the present invention, the method of making a pressure-tight seal comprises removing the surface contamination from a metallic member having an aperture therein and having a mean coefficient of thermal expansion of a predetermined value, heating the member in a non-oxidizing and non-reducing atmosphere with glass having a mean coefficient of thermal expansion substantially lower than the aforesaid predetermined value, to a temperature at which the glass becomes molten and substantially fills the aperture and fuses to the surface of the metallic member, and then cooling the seal below the melting temperature of the glass, whereby the glass is restrained in the metallic member by strong compressive forces.

For a better understanding of the present invention, together with other and further objects thereof, reference is had to the following description taken in connection with the accompanying drawing, and its scope will be pointed out in the claims.

Referring now to the drawing, FIG. 1 is a bottom perspective view of an electrical device including a pressure-tight seal in accordance with a particular form of the invention; FIG. 2 is an enlarged sectional view of a portion of the device of FIG. 1 taken along the line 2—2 of FIG. 1; and FIG. 3 is a perspective view of a fragmentary portion of an electrical device including a pressure-tight seal in accordance with another form of the invention.

*Description of Seal of FIGS. 1 and 2*

Referring now more particularly to FIGS. 1 and 2 of the drawing, there is represented an electrical device 10, such as a relay, having a metal cover 11 attached in a suitable manner as by soldering to a base in the form of a pressure-tight seal 12. Since the latter is pressure tight, the relay 10 may be evacuated or may just be hermetically sealed to exclude moisture. The seal 12 comprises a first metallic member 13 having a plurality of spaced apertures 14, specifically circular apertures, and having a mean coefficient of thermal expansion of a predetermined value. Although not expressly limited thereto, the member 13 may be of a standard screw machine steel often referred to in the trade as B-1112 or B-1113 steel. Such steel has a mean coefficient of thermal expansion of approximately $140 \times 10^{-7}$ units per unit length per degree centigrade. SAE 1010 steel having a mean thermal coefficient of expansion of about $125 \times 10^{-7}$ units per unit length per degree centigrade is another suitable material. Other relatively inexpensive and plentiful metals having thermal expansion characteristics within the range of $110 \times 10^{-7}$ to $178 \times 10^{-7}$ units per unit length per degree centigrade may be employed.

Individual glass members 15 of a material such as a lead or lime glass are supported in individual ones of the apertures 14 in the metallic member 13 and each of the members 15 has a centrally disposed aperture 16 therein. The pressure-tight seal 12 further includes a second metallic member 17 supported in each of the apertures 16 in the insulating members 15 and having a mean coefficient of thermal expansion substantially lower than the coefficient of the first member 13. The second metallic member 17 may be in the form of a solid cylindrical metal pin which serves as a terminal for connecting the relay 10 to an external electrical circuit. Each of the second metallic members may be of a ferrous-base alloy comprising essentially iron and nickel in the proportions of 40% to 55% nickel and the balance essentially iron, such an alloy having a mean thermal expansion in the range of $60 \times 10^{-7}$ to $97 \times 10^{-7}$ units per unit length per degree centigrade. A particular example of such an alloy found to have utility as one of the second metallic members 17 is an iron-nickel alloy containing about 52% nickel and 48% iron.

The glass member 15 has a means coefficient of thermal expansion within the range of values of the coefficients for the first and second metallic members 13 and 17. Ordinarily the expansion characteristic of the glass member 15 is selected so that it is at least equal to or somewhat greater than that of the metallic member 17. A glass having a mean thermal expansion coefficient of about $90 \times 10^{-7}$ units per unit length per degree centigrade has proved to seal well with metals of the type identified above. The thermal expansion coefficients of the members 13, 15 and 17 are such and the relative dimensions thereof are also such that each glass member 15 is restrained in its aperture 14 under radial compression by the metallic members 13 and 17 in the range of operating temperatures of the seal, the interface or contiguous portions of the members being in fused relation as will be explained more fully hereinafter.

*Method of Making the Seal of FIGS. 1 and 2*

It is ordinarily necessary to condition the metallic members 13 and 17 prior to assembling them in fused relation with the glass members 15, to assure a satisfactory bond. It may be desirable to degrease the metallic members in a suitable solvent such as carbon tetrachloride or trichloroethylene to prepare them for the subsequent film preparation. Alternatively, or following the operation just mentioned, the metallic members may be heated or fired in a wet hydrogen atmosphere at a temperature of approximately 1000° C. for a relatively short period of time to burn off or remove the surface contamination or impurities therefrom and to decarbonize the surfaces thereof. The purpose of a decarbonizing operation is to prevent any oxide which may be on the surfaces of the metallic members from uniting with the carbon to form bubbles in the joint later to be formed between the glass and the metal. When the metallic members 13 and 17 are of steel, the surfaces thereof may be oxidized by heating in an oxidizing atmosphere or by dipping the members in a suitable oxidizing solution such as ferric sulphate and phosphoric acid. A useful solution has the proportions of 320 grams of ferric sulphate to 42 centimeters of phosphoric acid and 6 liters of water. After dipping, the metallic members are rinsed in hot, clean water and then preferably dried rapidly. In the next operation the members 13 and 17, regardless of the type of metal used, are placed in a suitable jig in their proper geometric relation with reference to each other, and the glass is placed in the space between members 13 and 17. The jig, the glass, and the members 13 and 17 are then introduced into a controlled atmosphere in a sealing chamber such as a gas-fired furnace. The burners and the gas and air mixture in the furnace are so adjusted that the atmosphere therein is effectively neutral, that is, as near as possible nonreducing and nonoxidizing. The elevated temperature of the sealing chamber causes the glass to become molten thereby completely filling the space in the aperture 14 between the members 13 and 17, and the interfaces, or the contiguous portions of the members, then assume a fused relation or combination.

The metallic oxide layer on the metallic members may assist in effecting a bond between the glass and the metal because it is soluble in the glass at the fusing temperature and because the oxide layer on the metallic members has an irregular or roughened surface which enhances the clinging of the glass to the metal. Next the members are cooled below the melting temperature of the insulating or glass member and are removed from the jigs. Since the thermal expansion characteristics of the metallic members 13 and 17 are substantially different and the glass 15 has a thermal expansion characteristic within the range of the members 13 and 17 but at least equal to the inner member 17, the insulating member is firmly restrained in the aperture 14 under relatively high radial compression. The member 17 is also firmly restrained within the glass member 15. An annealing operation is not employed thereafter and, in fact, is not desired to relieve any stresses developed in the glass member 15. It is believed that the compressive stresses deliberately developed in the glass member tend to compact the fused joints at the interface, thereby causing them to be dense and effecively nonporous and thus effectively preventing leakage which may be caused by air or gas gradually infiltrating the joints.

The joints thus produced between the glass and the metallic members not only are nonporous but also are much stronger than conventional joints and are characterized by their unusal thermal and mechanical resistance to shock and stress. It has been found that the inner metallic member may be bent as by careless handling without serious damage to the glass member 15 or impairing the effectiveness of the seal.

Description of FIG. 3 Seal

Referring now to FIG. 3 of the drawing, there is represented a pressure-tight seal 35 which is similar to that illustrated in FIG. 1. This seal comprises a first metallic member 30 having a plurality of apertures 31 therein disposed near the periphery of the member. A glass member 32 is restrained in each of the apertures 31 under compression between the first metallic member 30 and a hollow second metallic member 33 which forms a terminal pin. The members 30 and 33 are in fused relation with the glass members 32. The metallic members 30 and 33 have mean coefficients of thermal expansion which are substantially different, with member 30 having a substantially higher coefficient than member 33. The glass member 32 confined between each of the metallic members has a mean coefficient of thermal expansion which is at least equal to that of its associated member 33 but within the range of values of the members 30 and 33. The pressure-tight seal of FIG. 3 may be made of selected materials as described above and in the manner previously explained in connection with the FIG. 1 embodiment of the invention. When a metallic member 30 having, for example, eight apertures 31 is available and only seven thermal pins or members 33 are required for some applications, one of the apertures 31 may be sealed with a solid glass member having no thermal pin therethrough.

FIG. 3 also illustrates the structure which results from a modification in the method previously described. In lieu of the described oxidizing operation of steel or iron-alloy members 30 and 33, an electrolytic deposit of a thin film of copper 36 may be made on the surfaces of metallic members after surface impurities have been removed therefrom. Thereafter, as explained above, the fusing operation is conducted in the sealing chamber and the sealed assembly is then cooled rather quickly to ambient temperature to form the final product, annealing, as before being unnecessary. In this instance, a strong bond between the metallic members, the copper film 36 which is integral therewith, and the glass member 32 is formed which has mechanical and thermal shock resistance characteristics similar to the bond between the oxide film and the glass previously described. The thin copper film 36 on the metallic members acts as a cushion between the metallic and the glass members and tends to relieve stresses in the interface substantially parallel to the axis of a member 33 but not perpendicular to that axis. Manifestly, the glass member 32 is under relatively high compression due to the described selection of the metallic and glass members.

From the foregoing descriptions of the various embodiments of the invention, it will be seen that pressure-tight seal in accordance with the present invention is relatively simple in construction and inexpensive to manufacture since it utilizes in the construction thereof plentiful and relatively inexpensive materials such as screw machine steel. It will also be clear that a strong durable bond between the metal and the glass is effected since the glass is deliberately maintained under compression in a manner which tends positively to restrain the glass within the confines of the metal supporting member or members. It will also be apparent that since the glass is purposely maintained under the influence of compressive stresses, time-consuming annealing operations are unnecessary to alleviate those stresses in the glass.

While there have been described what are at present considered to be the preferred embodiments of this invention, it will be obvious to those skilled in the art that various changes and modifications may be made therein without departing from the invention, and it is, therefore, aimed in the following claims to cover all such changes and modifications as fall within the true spirit and scope of the invention.

What is claimed is:

1. The method of making a compression, hermetic glass-to-metal seal comprising the steps of: forming an assembly, in a jig, of an outer metal member having a coefficient of thermal expansion greater than approximately $110 \times 10^{-7}$ units per unit length per degree centigrade and less than approximately $178 \times 10^{-7}$ units per unit length per degree centigrade, said outer metal member having at least one aperture therethrough, at least one inner metal member within said aperture and spaced from the inner periphery defining said aperture in said outer metal member, said inner metal member having a substantially lower coefficient of thermal expansion than that of said outer member, said coefficient of thermal expansion of said inner metal member being at least approximately $60 \times 10^{-7}$ units per unit length per degree centigrade but less than approximately $97 \times 10^{-7}$ units per unit length per degree centigrade, and glass in the space within said aperture and surrounding said inner member, said glass having a coefficient of thermal expansion substantially lower than that of said outer metal member but at least approximately as high as that of said inner member and of about $90 \times 10^{-7}$ units per unit length per degree centigrade; heating the entire assembly to a temperature at which the glass melts and flows radially of its own weight to fill the radial space between the inner and outer metal members; rapidly cooling the heated assembly from said temperature to a lower temperature which is below the annealing temperature of the glass to solidify and to avoid annealing the glass and to set up stress therein so as to increase the compressive forces holding said glass in said outer metal member in said glass; and removing said seal from said jig without annealing said seal.

2. A method as set forth in claim 1 wherein said assembly is heated in a substantially neutral atmosphere.

3. A method as set forth in claim 1 wherein said surfaces of said outer and inner metal members contiguous with said glass are oxidized prior to said assembly with said glass.

References Cited in the file of this patent

UNITED STATES PATENTS

| | | |
|---|---|---|
| 1,016,320 | Burnside | Feb. 6, 1912 |
| 1,456,110 | Mackay | May 22, 1923 |
| 2,238,599 | Ramage | Apr. 15, 1941 |
| 2,279,168 | Kalischer et al. | Apr. 7, 1942 |
| 2,345,278 | Monack | Mar. 28, 1944 |
| 2,549,504 | Messana | Apr. 17, 1951 |
| 2,558,878 | Richardson | July 3, 1951 |

FOREIGN PATENTS

| | | |
|---|---|---|
| 475,665 | Great Britain | Nov. 24, 1937 |
| 604,248 | Great Britain | June 30, 1948 |

OTHER REFERENCES

"Journal of Applied Physics," volume 17, article beginning on page 685, published in 1946 in Lancaster, Pa. by the American Institute of Physics.

"Journal of the American Ceramic Society," volume 33, article beginning on page 224, published in 1950 in Easton, Pa. by the American Ceramic Society.

"Glass Industry," volume 27, article beginning on page 389 published in 1946 in New York City.